United States Patent
Imai et al.

(10) Patent No.: US 11,247,677 B2
(45) Date of Patent: Feb. 15, 2022

(54) VEHICLE CONTROL DEVICE FOR MAINTAINING INTER-VEHICLE SPACING INCLUDING DURING MERGING

(71) Applicant: HITACHI AUTOMOTIVE SYSTEMS, LTD., Hitachinaka (JP)

(72) Inventors: Masato Imai, Tokyo (JP); Takao Kojima, Tokyo (JP); Kiyoshi Yorozuya, Tokyo (JP); Jun Kezuka, Tokyo (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 113 days.

(21) Appl. No.: 16/636,463

(22) PCT Filed: Aug. 8, 2018

(86) PCT No.: PCT/JP2018/029715
§ 371 (c)(1),
(2) Date: Feb. 4, 2020

(87) PCT Pub. No.: WO2019/039275
PCT Pub. Date: Feb. 28, 2019

(65) Prior Publication Data
US 2020/0189587 A1 Jun. 18, 2020

(30) Foreign Application Priority Data
Aug. 23, 2017 (JP) .............................. JP2017-159998

(51) Int. Cl.
*B60W 30/16* (2020.01)
*B60W 40/04* (2006.01)

(52) U.S. Cl.
CPC .......... *B60W 30/162* (2013.01); *B60W 40/04* (2013.01); *B60W 2554/801* (2020.02); *B60W 2720/10* (2013.01)

(58) Field of Classification Search
CPC .............. B60W 30/162; B60W 40/04; B60W 2554/801; B60W 2720/10
See application file for complete search history.

(56) References Cited

U.S. PATENT DOCUMENTS

| 6,418,370 B1 | 7/2002 | Isogai |
| 8,483,928 B2 * | 7/2013 | Shida ..................... G08G 1/22 701/96 |

(Continued)

FOREIGN PATENT DOCUMENTS

| EP | 3056405 | * 8/2016 | ............ B60W 30/16 |
| FR | 2704653 | * 11/1994 | ........... G01S 13/931 |

(Continued)

OTHER PUBLICATIONS

International Search Report with English translation and Written Opinion issued in corresponding application No. PCT/JP2018/029715 dated Dec. 11, 2018.

*Primary Examiner* — Peter D Nolan
*Assistant Examiner* — Kenneth M Dunne
(74) *Attorney, Agent, or Firm* — Foley & Lardner LLP

(57) ABSTRACT

A vehicle control device controls a vehicle on the basis of inter-vehicle spacing information with respect to a preceding vehicle and a trailing vehicle. The vehicle control device is equipped with: a target inter-vehicle spacing calculation unit which calculates target inter-vehicle spacing information on the basis of inter-vehicle spacing information with respect to the preceding vehicle and inter-vehicle spacing information with respect to a trailing vehicle. The vehicle control device is configured to control the speed of the vehicle such that the calculated target inter-vehicle spacing information is maintained.

9 Claims, 14 Drawing Sheets

(56) References Cited

U.S. PATENT DOCUMENTS

| | | | |
|---|---|---|---|
| 9,272,711 B1* | 3/2016 | Sivaraman | G08G 1/166 |
| 2007/0145818 A1* | 6/2007 | Kobayashi | B60T 7/22 |
| | | | 303/113.4 |
| 2011/0093177 A1* | 4/2011 | Horn | B60W 30/16 |
| | | | 701/70 |
| 2011/0130936 A1* | 6/2011 | Noda | G08G 1/167 |
| | | | 701/70 |
| 2017/0036679 A1* | 2/2017 | Takeda | B60W 40/04 |
| 2017/0076607 A1* | 3/2017 | Linder | B60Q 1/346 |
| 2017/0120912 A1* | 5/2017 | Ishioka | B60W 40/04 |
| 2017/0203764 A1 | 7/2017 | Fujiki | |
| 2018/0178796 A1* | 6/2018 | Fukuda | B60W 30/16 |
| 2018/0201275 A1* | 7/2018 | Tsuji | B60W 40/06 |
| 2019/0001977 A1* | 1/2019 | Lin | B60W 30/143 |
| 2019/0047564 A1* | 2/2019 | Brady | B60W 30/181 |
| 2019/0308617 A1* | 10/2019 | Groult | B60Q 1/46 |
| 2019/0315360 A1* | 10/2019 | Kim | B60W 30/18163 |
| 2020/0189598 A1* | 6/2020 | Eigel | B60W 30/162 |
| 2020/0307597 A1* | 10/2020 | Oka | B60W 30/162 |
| 2020/0331476 A1* | 10/2020 | Chen | G05D 1/0088 |

FOREIGN PATENT DOCUMENTS

| | | | | |
|---|---|---|---|---|
| JP | H07-172208 A | 7/1995 | | |
| JP | 2000-108720 A | 4/2000 | | |
| JP | 2002-052952 A | 2/2002 | | |
| JP | 200252952 | * | 2/2002 | B60K 31/00 |
| JP | 2008-265611 A | 11/2008 | | |
| JP | 2017-124743 A | 7/2017 | | |
| KR | 100892539 | * | 4/2009 | B60W 40/04 |

* cited by examiner

VEHICLE CONTROL DEVICE FOR MAINTAINING INTER-VEHICLE SPACING INCLUDING DURING MERGING

TECHNICAL FIELD

The present invention relates to a vehicle control device.

BACKGROUND ART

Various techniques have been proposed for recognizing objects around the vehicle (vehicles, pedestrians, structures, and the like) and road markings/signs (road surface paint such as lane markings, signs such as stops, and the like) using external environment recognition sensors such as in-vehicle cameras and radars. Furthermore, a technique for controlling the vehicle using these external environment recognition techniques to improve the occupant's sense of security and comfort has also been proposed.

In recent years, techniques for supporting manual traveling following a preceding vehicle or automatically performing traveling on behalf of the driver have been proposed (PTL 1). In the prior art described in PTL 1, when a trailing vehicle approaches the vehicle during execution of follow-up control in which the vehicle follows a preceding vehicle, acceleration/deceleration is corrected on the basis of the inter-vehicle spacing distance with the trailing vehicle to avoid contact with the preceding and trailing vehicles.

CITATION LIST

Patent Literature

PTL 1: JP 7-172208 A

SUMMARY OF INVENTION

Technical Problem

In the prior art disclosed in PTL 1, acceleration/deceleration is corrected to be gentler as the inter-vehicle spacing distance with the trailing vehicle is shorter. Therefore, when the inter-vehicle spacing distance with the trailing vehicle is short, if the preceding vehicle decelerates at deceleration equal to or greater than a prescribed value, there is a problem that the vehicle cannot generate deceleration to avoid contact with the preceding vehicle so that the vehicle approaches the preceding vehicle.

The present invention has been made in view of the above problem. An object of the present invention is to provide a vehicle control device capable of controlling the vehicle on the basis of inter-vehicle spacing information with a preceding vehicle and a trailing vehicle.

Solution to Problem

In order to solve the above-mentioned problem, a vehicle control device according to one aspect of the present invention is a vehicle control device that controls a vehicle so as to maintain inter-vehicle spacing with a preceding vehicle. The device includes a target inter-vehicle spacing calculation unit that calculates target inter-vehicle spacing information based on inter-vehicle spacing information with the preceding vehicle and inter-vehicle spacing information with a trailing vehicle, and a vehicle control unit that controls the speed of the vehicle so as to maintain the target inter-vehicle spacing information calculated.

Advantageous Effects of Invention

According to the present invention, the target inter-vehicle information can be calculated based on the inter-vehicle information with the preceding vehicle and the inter-vehicle with the trailing vehicle, and the speed of the vehicle is controlled so as to hold the calculated target inter-vehicle information. Thereby, both usability and safety can be achieved.

DESCRIPTION OF EMBODIMENTS

Hereinafter, embodiments of the present invention will be described with reference to the drawings. As will be described later, in the present embodiment, in a transition period of the target inter-vehicle spacing information at the time of lane change (at the time of setting change), the inter-vehicle spacing is temporarily decreased from a previous value (prescribed value before the setting change) to the inter-vehicle spacing with a preceding vehicle at that time of performing a lane change (target inter-vehicle spacing information=inter-vehicle spacing information with preceding vehicle<prescribed value before setting change). Thereafter, on the basis of the inter-vehicle spacing information with a trailing vehicle, the target inter-vehicle spacing information is restored to the prescribed value before the setting change at a prescribed change rate.

Therefore, the vehicle control device according to the present embodiment is a vehicle control device that detects inter-vehicle spacing information with a preceding vehicle and controls the speed of the vehicle so as to maintain a preset inter-vehicle spacing information set value. The vehicle control device detects inter-vehicle spacing information with a trailing vehicle, sets the target inter-vehicle spacing within a prescribed range on the basis of the inter-vehicle spacing information with the preceding vehicle and the inter-vehicle spacing information with the trailing vehicle, and controls the speed of the vehicle so as to maintain the target inter-vehicle spacing set.

Thereby, according to the present embodiment, since the inter-vehicle spacing set value with respect to the preceding vehicle is dynamically changed on the basis of the inter-vehicle spacing information (inter-vehicle spacing time or inter-vehicle spacing distance) with the trailing vehicle, smooth and safe traveling in consideration of both the preceding vehicle and the trailing vehicle can be made. Further, in the present embodiment, since a case of causing the trailing vehicle to make inadvertent sudden deceleration is suppressed, adverse effects (such as occurrence of traffic congestion) on the traffic flow behind the trailing vehicle can be reduced.

First Embodiment

Figure 1:
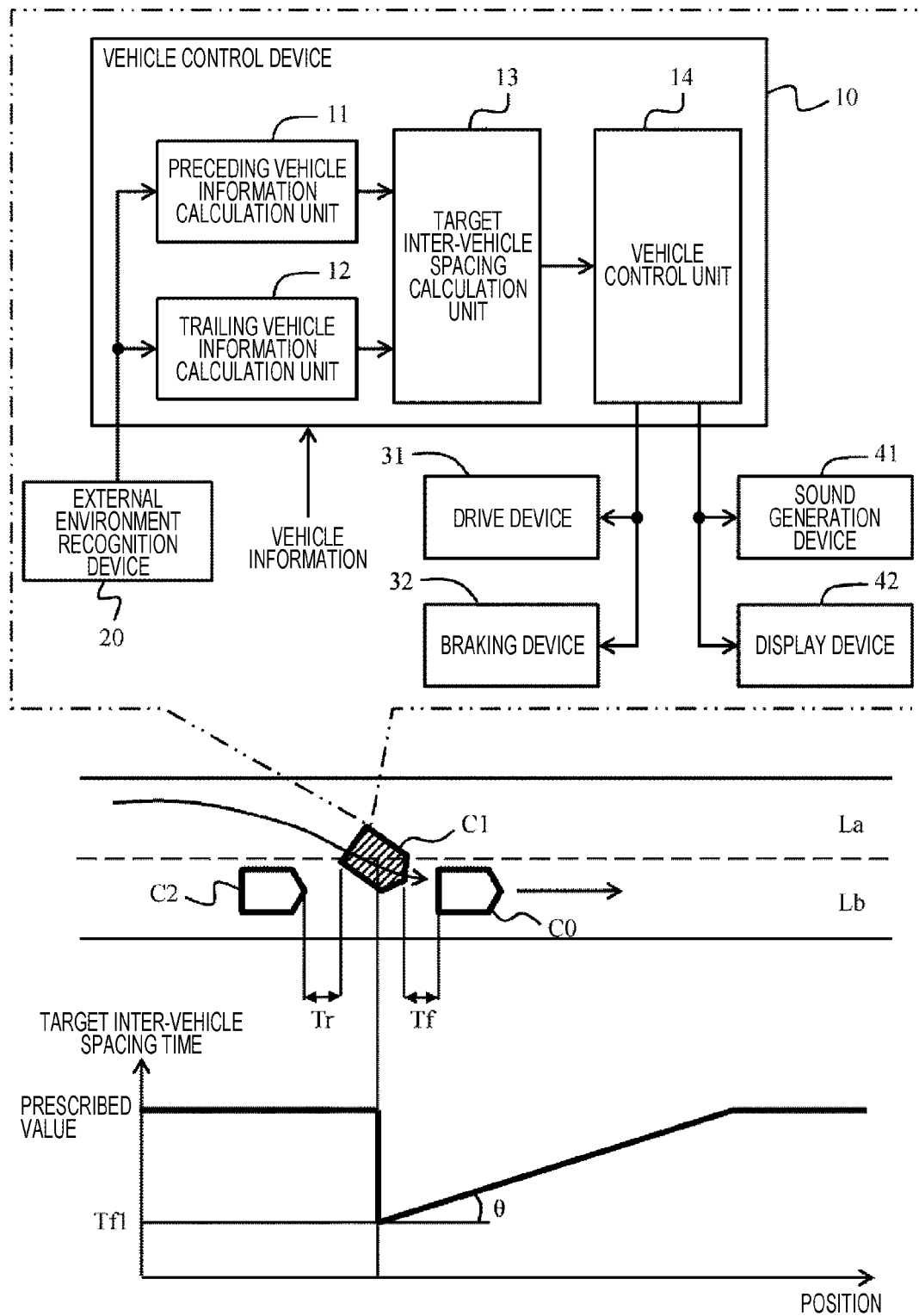
FIG. 1 is an explanatory diagram showing an overall configuration of a vehicle control device.

An embodiment will be described with reference to FIGS. 1 to 8. FIG. 1 is an explanatory diagram showing the overall configuration of a vehicle control device 10.

FIG. 1 shows the vehicle control device 10 and its peripheral devices 20, 31, 32, 41, and 42. The vehicle control device 10 illustrated in FIG. 1 is a computer that controls the vehicle, and executes a program stored in a storage medium, not shown, to thereby realize functions such as a preceding vehicle information calculation unit 11, a trailing vehicle information calculation unit 12, a target inter-vehicle spacing calculation unit 13, and a vehicle control unit 14.

The vehicle control device 10 is connected to an external environment recognition device 20, a drive device 31, a braking device 32, a sound generation device 41, and a display device 42. Further, the vehicle control device 10 acquires vehicle information such as vehicle speed, steering angle, and a yaw rate from respective sensors in the vehicle via a communication network, not shown, of the vehicle. For example, a controller area network (CAN) is known as a communication network used in the vehicle. CAN is a network standard for connecting on-board electronic circuits and devices.

The external environment recognition device 20 is a device that acquires information related to the surrounding environment of the vehicle, namely an in-vehicle stereo camera that captures the front of the vehicle, or four in-vehicle cameras that capture surrounding environment of the front, the back, the right side, and the left side of the vehicle respectively, for example.

These in-vehicle cameras each have a function of detecting, with use of the obtained image data, shape and position of objects such as stationary solid objects around the vehicle, moving objects, road surface paint such as lane markings, signs, and the like, and also detecting unevenness on the road surface to determine whether or not it is a road on which the vehicle can travel.

Here, the stationary solid object is, for example, a parked vehicle, a wall, a pole, a pylon, a curb, a car stop, or the like. Further, the moving body is, for example, a pedestrian, a bicycle, a motorcycle, a vehicle, or the like. Furthermore, it is also possible to have a structure that detects presence or absence of lighting of a brake lamp or a direction indicator, presence or absence of a person in a vehicle, and the like as information for predicting the state of a moving body. Hereinafter, a stationary solid object and a moving object are collectively referred to as obstacles.

The shape and position of an object can be detected using, for example, a pattern matching method or other methods. The position of an object can be expressed using, for example, a coordinate system in which the origin is located at the position of the in-vehicle camera that captures the front of the vehicle. Then, obtained information such as the type, distance, and direction of the object is output to the vehicle control device 10 using a dedicated line, a CAN, or the like.

Note that an image obtained by the in-vehicle camera may be output to the vehicle control device 10 using a dedicated line or the like, and the image data may be processed in the vehicle control device 10. In addition to the on-vehicle camera, a radar that measures the distance to the object using millimeter waves or a laser beam, a sonar that measures the distance to the object using ultrasonic waves, and the like can be used. Information such as the distance to the object and its direction obtained by the radar or the sonar is output to the vehicle control device 10 using a dedicated line, a CAN, or the like.

A communication device for performing communication with the outside of the vehicle may be included in the external environment recognition device 20. The vehicle control device 10 can exchange information on the vehicle position, speed, and the like through communication with other vehicles around the vehicle using the communication device. The vehicle control device 10 can also communicate with a roadside communicator using the communication device to thereby exchange information that cannot be detected by the sensors mounted on the vehicle (for example, information on an obstacle in the blind spot of the vehicle).

The drive device 31 is configured of, for example, an engine system that operates according to a drive command from the vehicle control device 10, an electric powertrain system that can be controlled by a drive command from the vehicle control device 10, or the like. In such an engine system, when a drive command is received from the vehicle control device 10, the engine torque is controlled by the operation of an electric throttle or the like. In the electric powertrain system, when it receives a drive command from the vehicle control device 10, the electric powertrain system controls the driving force by a motor or the like.

The braking device 32 includes an electric brake, a hydraulic brake, or the like. These brakes control the braking force according to a braking command from the vehicle control device 10.

The sound generation device 41 can be configured of a speaker or the like. The vehicle control device 10 causes the sound generation device 41 to output a warning, voice guidance, and the like for the driver.

The display device 42 can be configured of a display such as a navigation device, a meter panel, a warning light, and the like. In addition to the operation screen of the vehicle control device 10, the vehicle control device 10 provides a screen or the like that visually represents the traveling state of the vehicle from the display device 42 to the occupant.

Note that the vehicle control device 10 can also control a steering device 33, as will be described in the embodiments provided below. The steering device 33 can include an electric power steering or a hydraulic power steering. When the power steering receives a drive command from the vehicle control device 10, the power steering operates an electric or hydraulic actuator or the like to control the steering angle.

The functions realized by the vehicle control device 10 will be described. The preceding vehicle information calculation unit 11 selects a vehicle that the own vehicle follows, from among the vehicles around the own vehicle detected by the external environment recognition device 20, as a preceding vehicle, and calculates the inter-vehicle spacing distance, the relative speed, and the inter-vehicle spacing time between the preceding vehicle and the own vehicle. As for the method of selecting the preceding vehicle, it is possible to use a known method such as selecting a vehicle ahead of the own vehicle on the traveling route as a preceding vehicle.

The trailing vehicle information calculation unit 12 selects a vehicle that follows the own vehicle, from among the vehicles around the own vehicle detected by the external environment recognition device 20, as a trailing vehicle, and calculates the inter-vehicle spacing distance, the relative speed, and the inter-vehicle spacing time between the trailing vehicle and the own vehicle. As for the method of selecting the trailing vehicle, it is possible to use a known method such as selecting a vehicle behind the own vehicle on the traveling route as a trailing vehicle.

The target inter-vehicle spacing calculation unit 13 normally sets a prescribed value (inter-vehicle spacing distance set value), set in advance when the system is started, as target inter-vehicle spacing (target inter-vehicle spacing value). The prescribed value can be displayed as Tset, as shown in other drawings described below.

When it is determined that the target inter-vehicle spacing needs to be changed on the basis of the information calculated by the preceding vehicle information calculation unit 11 and the information calculated by the trailing vehicle information calculation unit 12, the target inter-vehicle spacing calculation unit 13 calculates new inter-vehicle spacing.

Note that the inter-vehicle spacing set value, set in advance, may be manually set by the occupant using switch operation, touch panel operation, voice recognition, or the like. The inter-vehicle spacing set value as the "prescribed value before setting change" and the target inter-vehicle spacing can be expressed by either the inter-vehicle spacing distance or the inter-vehicle spacing time. In the following description, the inter-vehicle spacing time is employed.

The vehicle control unit 14 controls the vehicle so as to maintain the inter-vehicle spacing with the preceding vehicle at the target inter-vehicle spacing, on the basis of the information calculated by the target inter-vehicle spacing calculation unit 13. Further, when there is no preceding vehicle, the vehicle control unit 14 controls the vehicle in accordance with the set speed set in advance by the occupant. Furthermore, when information such as speed limit information and road curvature can be used, the vehicle control unit 14 can also control the vehicle using the speed according to the information as an upper limit value.

Then, the vehicle control unit 14 calculates the target speed for controlling the vehicle, and calculates control parameters for realizing the target speed. The control parameters include target engine torque and target brake pressure. The vehicle control unit 14 outputs the calculated control parameters to the drive device 31 and the braking device 32.

In addition, the vehicle control unit 14 notifies the occupant of predetermined information through the sound generation device 41 and/or the display device 42. The predetermined information includes, for example, information on the target speed, the situation when the target inter-vehicle spacing is changed by the target inter-vehicle spacing calculation unit 13, information on the preceding vehicle selected by the preceding vehicle information calculation unit 11, information on the trailing vehicle selected by the trailing vehicle information calculation unit 12, and the like.

As shown in the lower part of FIG. 1, when a vehicle C1 moves from a lane La on which it is currently traveling to an adjacent lane Lb, the vehicle control device 10 according to the present embodiment recognizes, of the vehicles C0 and C2 traveling on the adjacent lane Lb, a vehicle C0 traveling ahead of the vehicle C1 as a preceding vehicle, and recognizes a vehicle C2 traveling behind the vehicle C1 as a trailing vehicle.

Then, the vehicle control device 10 calculates a target inter-vehicle spacing time Tf1 on the basis of an inter-vehicle spacing time Tf with the preceding vehicle and an inter-vehicle spacing time Tr with the trailing vehicle C2 when recognizing the preceding vehicle C0 and the trailing vehicle C1 at the time of lane change. As will be described in detail with reference to FIG. 2 and after, the target inter-vehicle spacing calculation unit 13 of the vehicle control device 10 calculates the target inter-vehicle spacing time Tf1 from the inter-vehicle spacing time Tf with the preceding vehicle C0 at the point of time of recognizing the preceding vehicle and the trailing vehicle (predetermined timing).

The target inter-vehicle spacing time Tf1 is generally smaller than a prescribed value (inter-vehicle spacing set value) before the setting change (target inter-vehicle spacing time Tf1<prescribed value). This is because when changing the lane, the vehicle immediately moves to the adjacent lane Lb after the preceding vehicle C0 has passed.

After the lane change, the target inter-vehicle spacing calculation unit 13 gradually restores the target inter-vehicle spacing time Tf1 to the prescribed value that is the target inter-vehicle spacing time before the lane change at a predetermined change rate θ. That is, the target inter-vehicle spacing calculation unit 13 increases the value of the target inter-vehicle spacing time from a short value Tf1 immediately after the lane change to the prescribed value that is a normal value before the lane change, at the predetermined change rate θ.

An example of the processing procedure of the vehicle control device 10 will be described using the flowchart of FIG. 2. The vehicle control device 10 acquires external environment information and vehicle information (S10). Here, the external environment information is information input by the external environment recognition device 20. The vehicle information is information such as vehicle speed, steering angle, and yaw rate of the vehicle.

The preceding vehicle information calculation unit 11 of the vehicle control device 10 uses the external environment information acquired in step S10 to determine the preceding vehicle from among the surrounding vehicles, and calculates the preceding vehicle information (inter-vehicle spacing distance, relative speed, inter-vehicle spacing time) (S11).

The trailing vehicle information calculation unit 12 of the vehicle control device 10 uses the external environment information acquired in step S10 to determine the trailing vehicle from among the surrounding vehicles, and calculates the trailing vehicle information (inter-vehicle spacing distance, relative speed, inter-vehicle spacing time) (S12).

The target inter-vehicle spacing calculation unit 13 of the vehicle control device 10 calculates the target inter-vehicle spacing to be used immediately after the lane change by using the preceding vehicle information calculated in step S11 and the trailing vehicle information calculated in step S12 (S13).

The vehicle control unit 14 of the vehicle control device 10 calculates control parameters for driving the vehicle so as to maintain the target inter-vehicle spacing calculated in step S13 (S14). Here, the control parameters are, for example, target engine torque and target brake pressure. Step S14 is an example of a "control parameter calculation unit".

The vehicle control unit 14 outputs the control parameters calculated in step S14 to the drive device 31 and the braking device 32, and ends the series of processes (S15). Specifically, among the control parameters calculated in step S14, the vehicle control unit 14 outputs a control parameter related to the drive device 31 to the drive device 31, and outputs a control parameter related to the braking device 32 to the braking device 32. Step S15 is an example of a "control parameter output unit".

The control parameters output to the drive device 31 and the braking device 32 include target engine torque, target brake pressure, and the like for realizing the target speed. Alternatively, depending on the configurations of the drive device 31 and the braking device 32, the target speed may be directly output from the vehicle control unit 14 to the drive device 31 and the braking device 32.

Details of step S13 in FIG. 2 will be described using the flowchart of FIG. 3. FIG. 3 is a flowchart regarding the target inter-vehicle spacing calculation process (S13 in FIG. 2).

Figure 2:
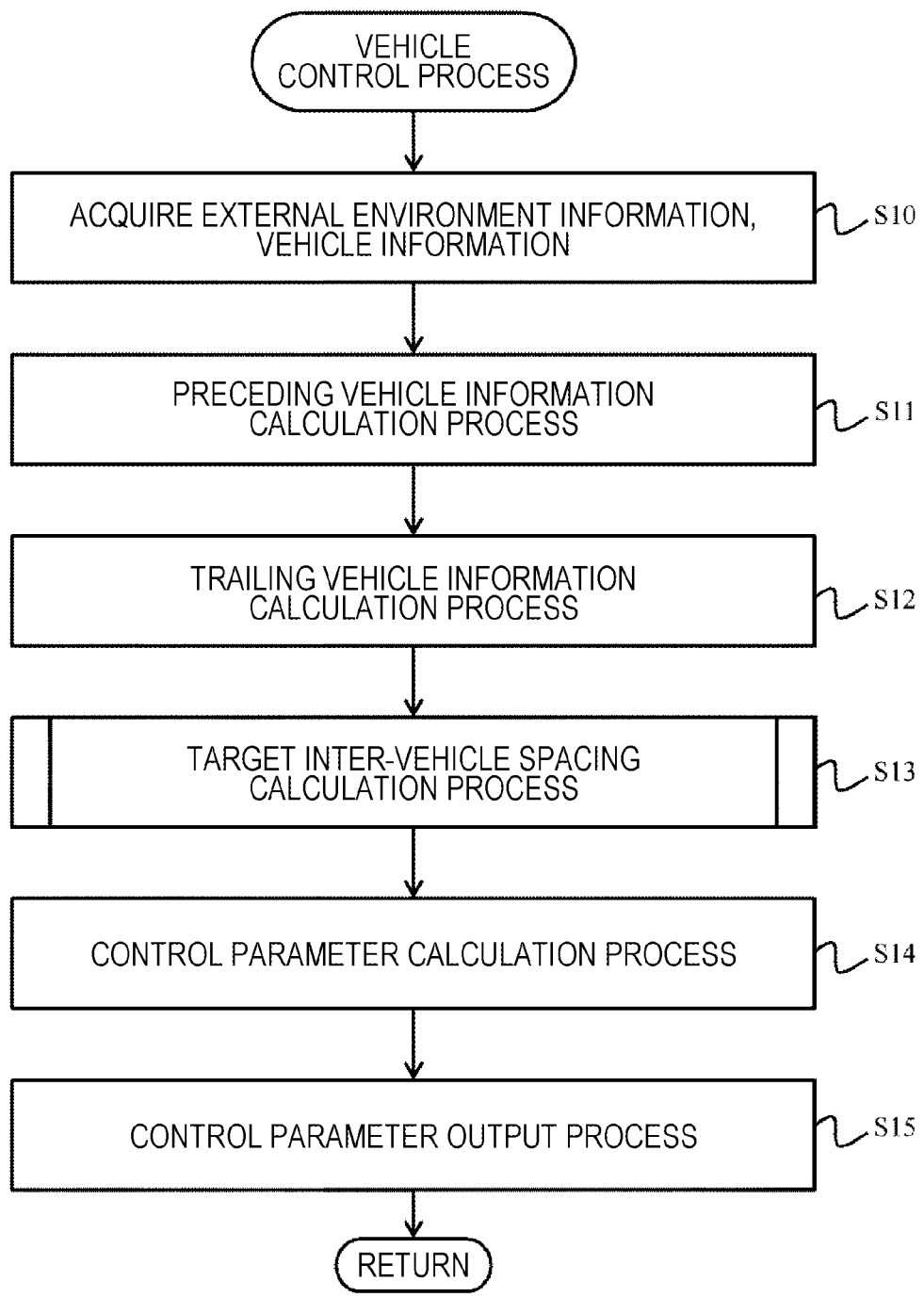
FIG. 2 is a flowchart showing a vehicle control process.
Figure 3:
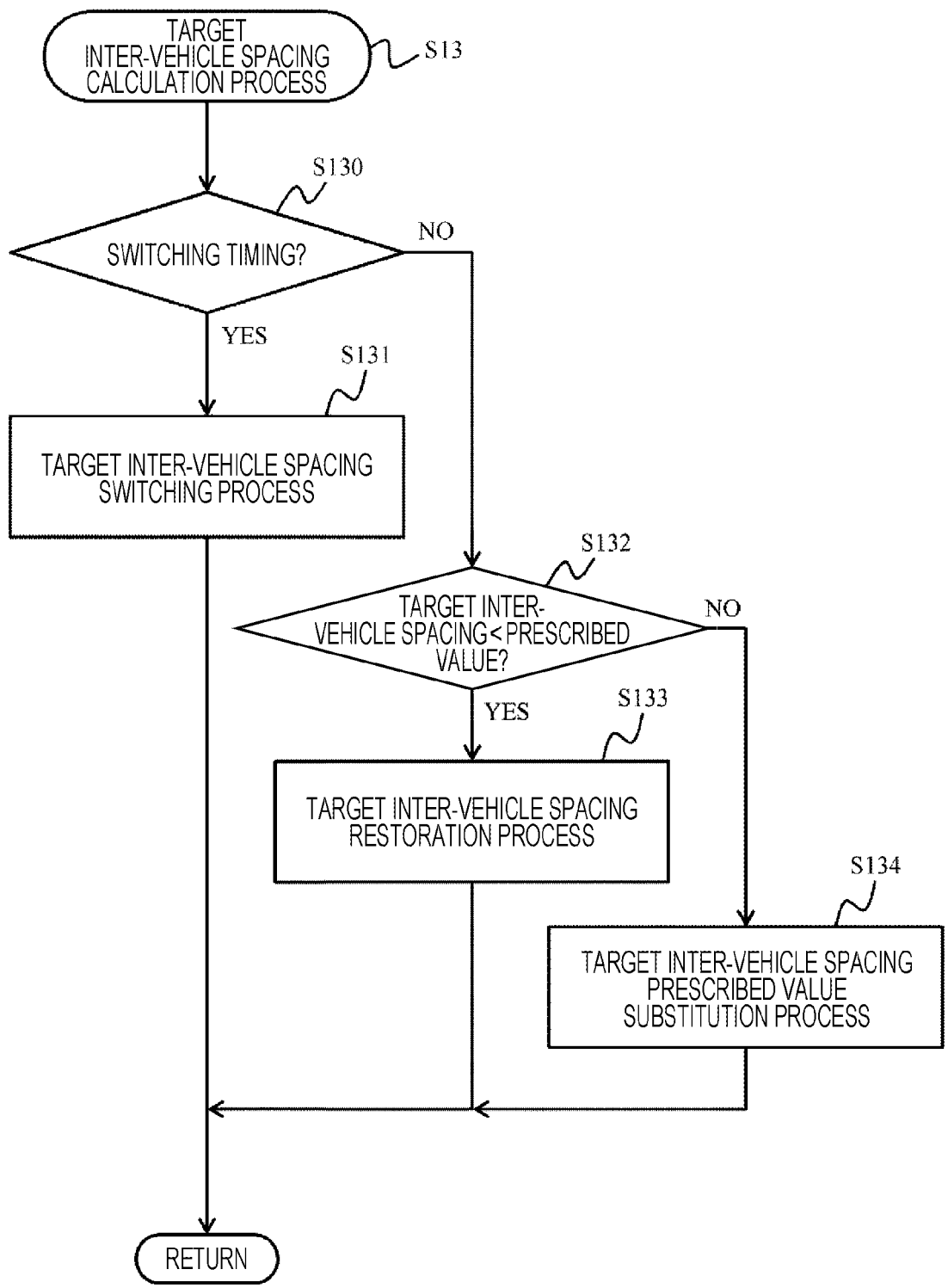
FIG. 3 is a flowchart showing details of some steps in FIG. 2.

The target inter-vehicle spacing calculation unit 13 determines whether it is the timing to switch the target inter-vehicle spacing, using the preceding vehicle information and the trailing vehicle information calculated in step S11 and step S12 of FIG. 2 (S130). The switching timing corresponds to "predetermined timing".

Upon determining that the timing of switching the target inter-vehicle spacing has arrived (S130: YES), the target inter-vehicle spacing calculation unit 13 switches the inter-vehicle spacing from the preset prescribed value (inter-vehicle spacing set value) to the target inter-vehicle spacing Tf1 on the basis of the preceding vehicle information and the trailing vehicle information, and ends the series of processes.

At this time, when the target inter-vehicle spacing to be switched is Tf1 and the inter-vehicle spacing with the trailing vehicle is a prescribed value (for example, inter-vehicle spacing time is 1 second) or less, the inter-vehicle spacing Tf with the preceding vehicle is set as the target inter-vehicle spacing Tf1. However, when the inter-vehicle spacing Tf with the preceding vehicle is less than a prescribed value Tfmin (for example, an inter-vehicle spacing time of 0.2 seconds) that is a lower limit threshold (Tf<Tfmin), the target inter-vehicle spacing calculation unit 13 sets the determined prescribed value, rather than setting the inter-vehicle spacing Tf with the preceding vehicle as the target inter-vehicle spacing (described later in FIG. 7).

In the present embodiment, when the trailing vehicle is approaching and the vehicle is not too close to the preceding vehicle, the inter-vehicle spacing Tf with the preceding vehicle at the time of lane change is used as the target inter-vehicle spacing time Tf1. Therefore, in the present embodiment, the vehicle can be prevented from excessively approaching the preceding vehicle.

On the other hand, when the target inter-vehicle spacing calculation unit 13 determines that it is not the switching timing (S130: NO), it determines whether or not the current target inter-vehicle spacing Tf is less than the prescribed value (S132). When the target inter-vehicle spacing calculation unit 13 determines that the current target inter-vehicle spacing Tf is less than the prescribed value (S132: YES), the target inter-vehicle spacing calculation unit 13 executes a process to restore the target inter-vehicle spacing Tf to the prescribed value (S133), and ends the series of processes.

Here, as a method of restoring the target inter-vehicle spacing to the set value, there is a method of determining the amount of change (gradient) θ for restoration on the basis of the inter-vehicle spacing with the trailing vehicle, and gradually restoring it to the set value every processing cycle. For example, when the inter-vehicle spacing with the trailing vehicle is small, the amount of change to be restored is reduced so as not to suddenly approach the trailing vehicle, while when the inter-vehicle spacing with the trailing vehicle is large, the amount of change to be restored is increased.

On the other hand, when determining that the current target inter-vehicle spacing Tf is equal to or greater than the prescribed value (S132: NO), the target inter-vehicle spacing calculation unit 13 substitutes the prescribed value for the target inter-vehicle spacing Tf, and ends the series of processes.

As described above, according to the present embodiment, it is possible to control the target inter-vehicle spacing on the basis of both the preceding vehicle information and the trailing vehicle information, so that it is possible to prevent a sudden approach to the trailing vehicle and to perform smooth and safe speed control.

Figure 4:
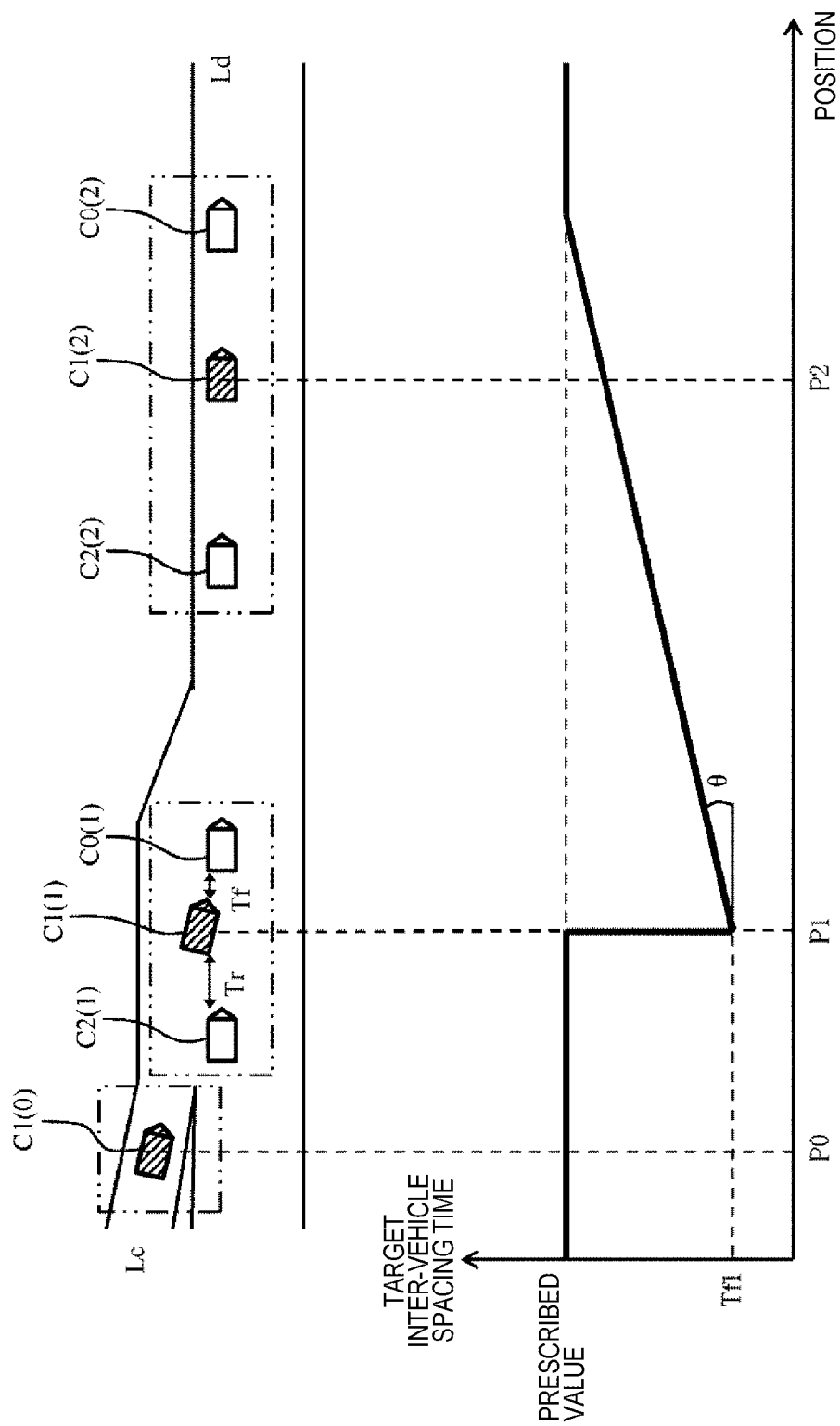
FIG. 4 is an explanatory diagram showing a state of changing the target inter-vehicle spacing time.
Figure 5:
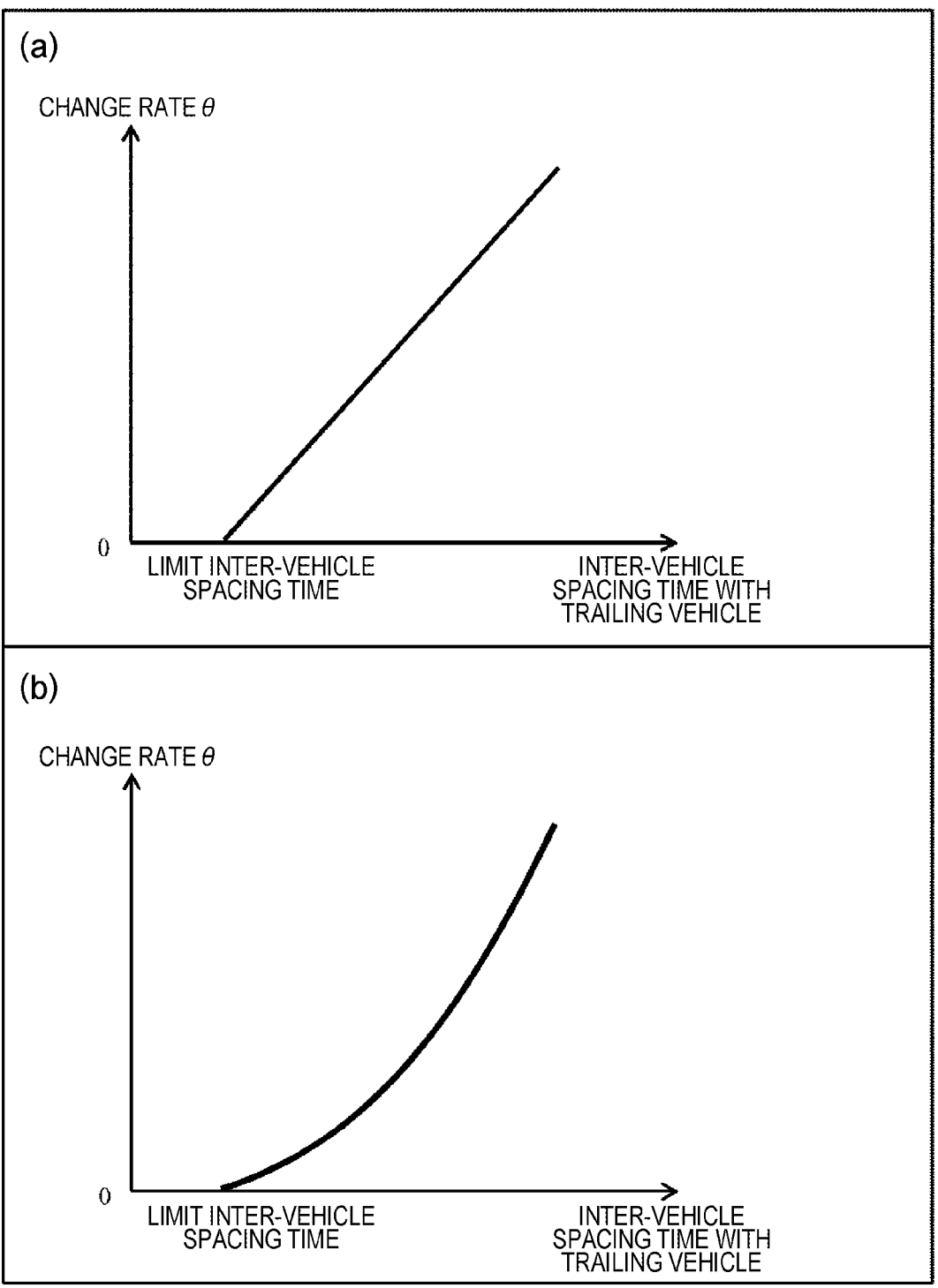
FIG. 5 is a graph showing an exemplary setting of a change rate at the time of restoring the target inter-vehicle spacing time to a prescribed value.
Figure 6:
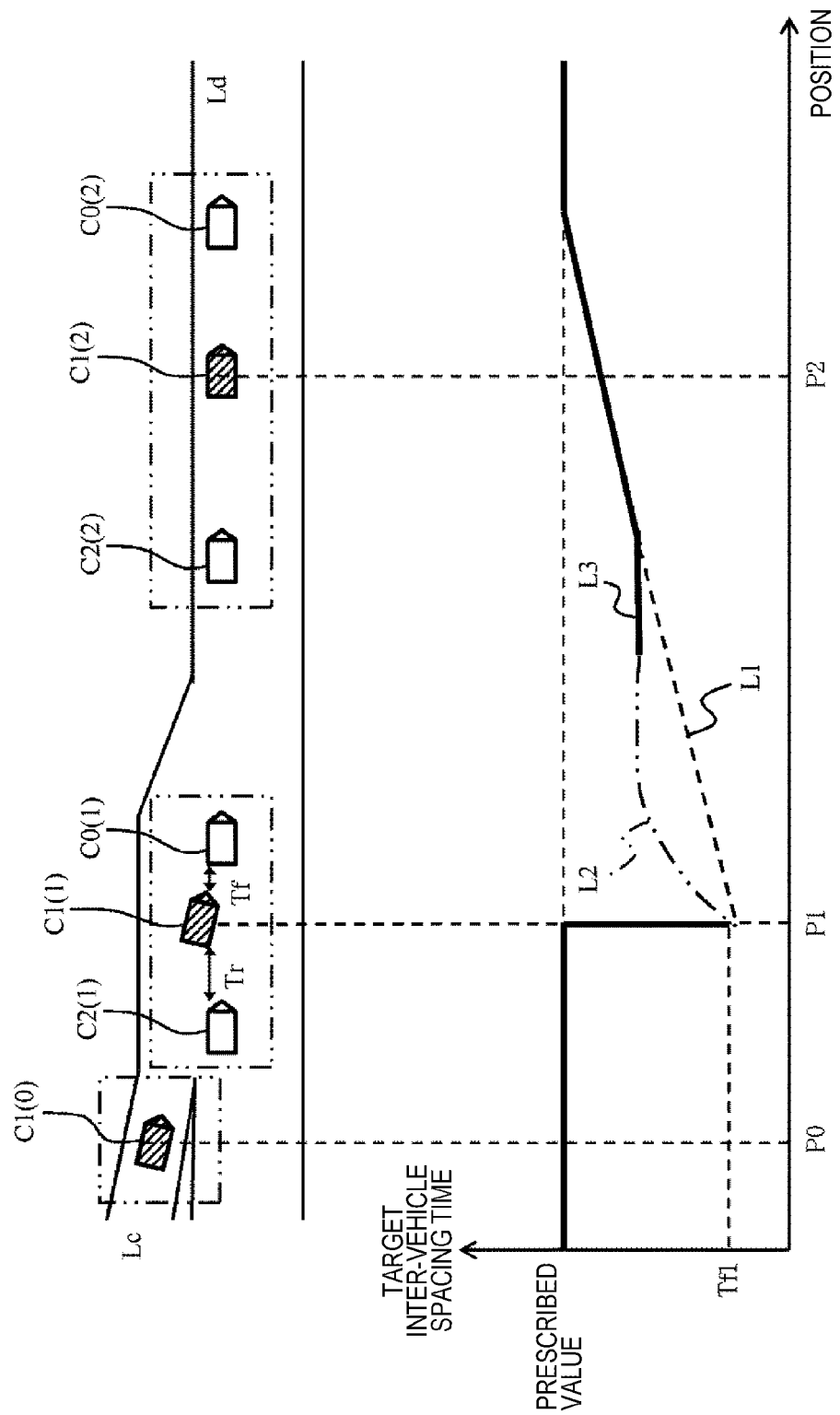
FIG. 6 is an explanatory diagram showing another state of changing the target inter-vehicle spacing time.
Figure 7:
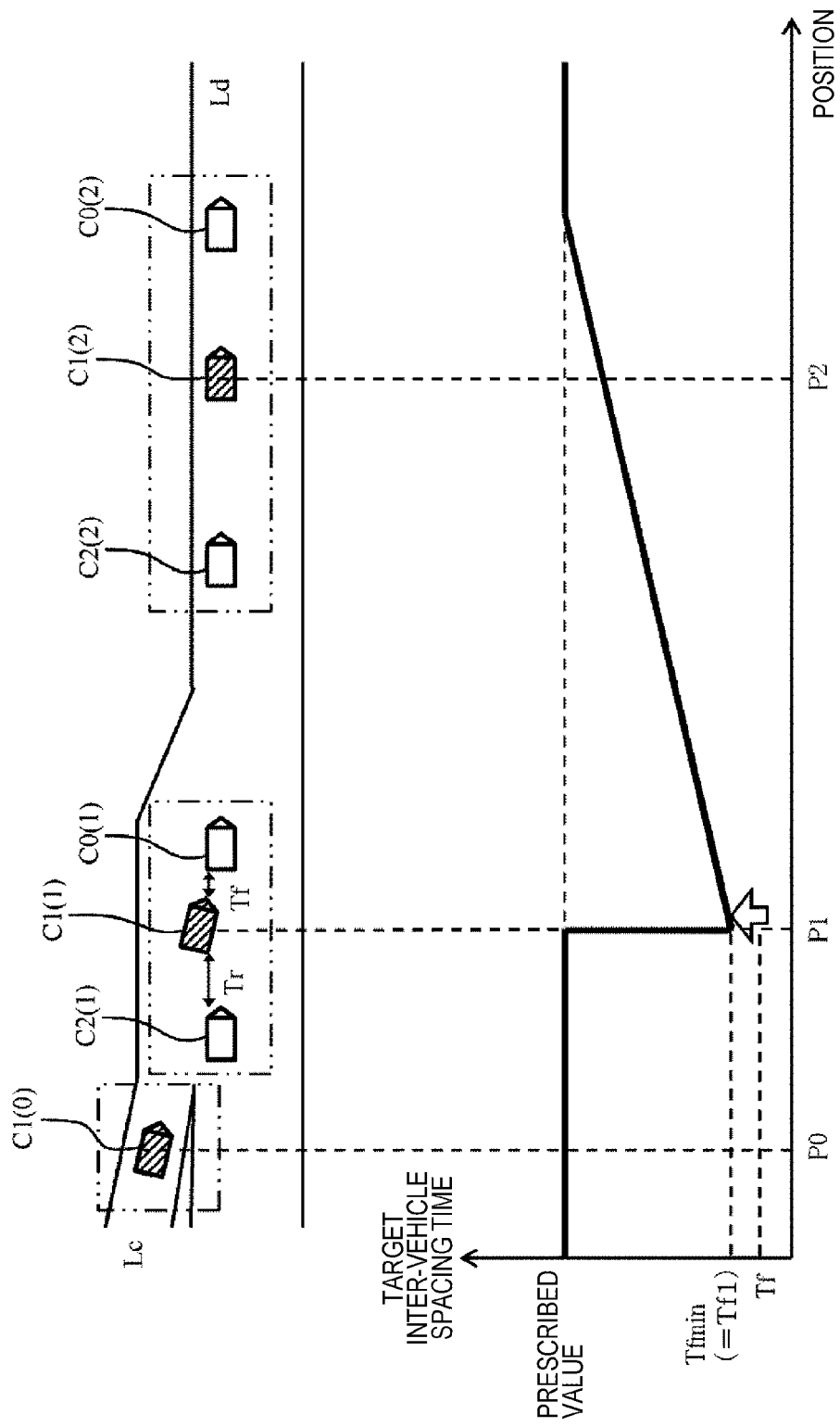
FIG. 7 is an explanatory diagram showing still another example of changing the target inter-vehicle spacing time.

An exemplary operation of the present embodiment will be described with reference to FIGS. 4 to 8. FIGS. 4, 6, and 7 are state explanation diagrams assuming a scene in which the vehicle C1 joins a main line Ld having two lanes from a merging lane Lc. Illustration of a line for separating the lanes of the main line is omitted. The present embodiment shows merging on left side traffic. Therefore, in the main line as illustrated, the blank area on the right side is an adjacent lane. The same applies to the case where the vehicle traveling on any lane of the main line Ld moves to another lane. In the following description, in order to show the time-series order, the number in a parenthesis is attached to the reference sign of a vehicle.

At a point P0 in FIG. 4, the vehicle C1(0) is controlled according to a preset prescribed value of the target inter-vehicle spacing. The vehicle C1(0) is traveling on the merging lane Lc, and the vehicles C0 and C1 are traveling on the main line Ld. The vehicle C1(0) starts merging while traveling in parallel with the vehicles C0 and C1.

When the vehicle C1(1) reaches a point P1, it recognizes the preceding vehicle C0(1) as a preceding vehicle and the trailing vehicle C2(2) as a trailing vehicle. At this time, in the case where the inter-vehicle spacing time Tr with the trailing vehicle C2(1) is a prescribed value (for example, 1 second) or less and the inter-vehicle spacing time Tf with the preceding vehicle C0(1) is less than the prescribed value, the inter-vehicle spacing time Tf with the preceding vehicle C0(1) is set as the target inter-vehicle spacing time Tf1.

Thus, at the time of lane change, the target inter-vehicle spacing is temporarily changed to the value Tf1 lower than the prescribed value. Thereafter, the target inter-vehicle spacing Tf1 gradually increases at a predetermined change rate θ and is restored to the prescribed value that is the original value at a point P2.

An example of setting the change rate (gradient) θ to be used when restoring the target inter-vehicle spacing to the prescribed value will be described with reference to FIG. 5. FIG. 5 is a graph showing the change rate θ based on the inter-vehicle spacing time Tr with the trailing vehicle.

In FIG. 5(a), the inter-vehicle spacing time Tr with the trailing vehicle and the change rate θ are in a linear relationship. However, when the inter-vehicle spacing time Tr with the trailing vehicle is equal to or less than a limit inter-vehicle spacing time, the change rate θ is set to zero to prevent the vehicle from approaching the trailing vehicle by itself.

FIG. 5(b) shows another example in which the inter-vehicle spacing time Tr with the trailing vehicle and the change rate θ are in a curved relationship. Even in this case, as in FIG. 5(a), when the inter-vehicle spacing time Tr with the trailing vehicle is equal to or less than the limit inter-vehicle spacing time, the change rate θ is set to zero so as not to approach the trailing vehicle by itself.

Note that the change rate θ may be set uniquely from the inter-vehicle spacing time Tr with the trailing vehicle at the point P1. Alternatively, the target inter-vehicle spacing time may be set with reference to the sequential change rate θ for each processing cycle.

FIG. 6 shows the case where the vehicles C0 and C2 traveling on the main line Ld are faster than the vehicle C1 when the vehicle C1 joins, with respect to the state described in FIG. 4.

As in the case of FIG. 4, at the point P1, the vehicle control device 10 determines that the vehicle C0 is the preceding vehicle and the vehicle C2 is the trailing vehicle.

When the inter-vehicle spacing time Tr with the trailing vehicle C2 is a prescribed value (for example, 1 second) or less and the inter-vehicle spacing time Tf with the preceding vehicle C0 is less than the prescribed value, the inter-vehicle spacing time Tf with the preceding vehicle C0 is set as the target inter-vehicle spacing time Tf1.

At this time, the target inter-vehicle spacing time using the change rate θ determined on the basis of the inter-vehicle spacing time Tr with the trailing vehicle should be one as shown by the broken line L1. However, here, since the preceding vehicle C0 is faster than the vehicle C1, the inter-vehicle spacing time Tf with the preceding vehicle C0 is changed like a two-dot chain line L2.

When the vehicle speed of the preceding vehicle C0 at the time of lane change is faster than the vehicle speed of the vehicle C1, the target inter-vehicle spacing time L3 in which the value is not decreased is set at the timing when the inter-vehicle spacing time Tf with the preceding vehicle C0 is changed from the increasing tendency to the decreasing tendency. Then, the process continues until it intersects with the broken line L1, and then, the same operation as in FIG. 4 is executed. Thereby, the target inter-vehicle spacing time can be set in consideration of the speed difference between the vehicle C1 and the vehicle C0 on the main line.

FIG. 7 shows the case where the inter-vehicle spacing time Tf with the vehicle C0 traveling on the main line Ld is short when the vehicle C1 joins the main line Ld from the merging lane Lc, with respect to the state described in FIG. 7.

As in the case of FIG. 4, it is assumed that the vehicle C0(1) is determined as a preceding vehicle and the vehicle C2(1) is determined as a trailing vehicle at the point P1.

When the inter-vehicle spacing time Tr with the trailing vehicle C2(1) has a prescribed value (for example, 1 second) or less, and the inter-vehicle spacing time Tf with the preceding vehicle C0(1) is less than the prescribed value and equal to or lower than a minimum threshold Tfmin (for example, 0.2 second), the minimum threshold Tfmin is set as the target inter-vehicle spacing Tf1.

Thereafter, the same operation as in FIG. 4 is executed. As a result, it is possible to prevent the vehicle C1 from inadvertently approaching the preceding vehicle C0 excessively, and to reduce the possibility of being in contact with the preceding vehicle C0.

Figure 8:
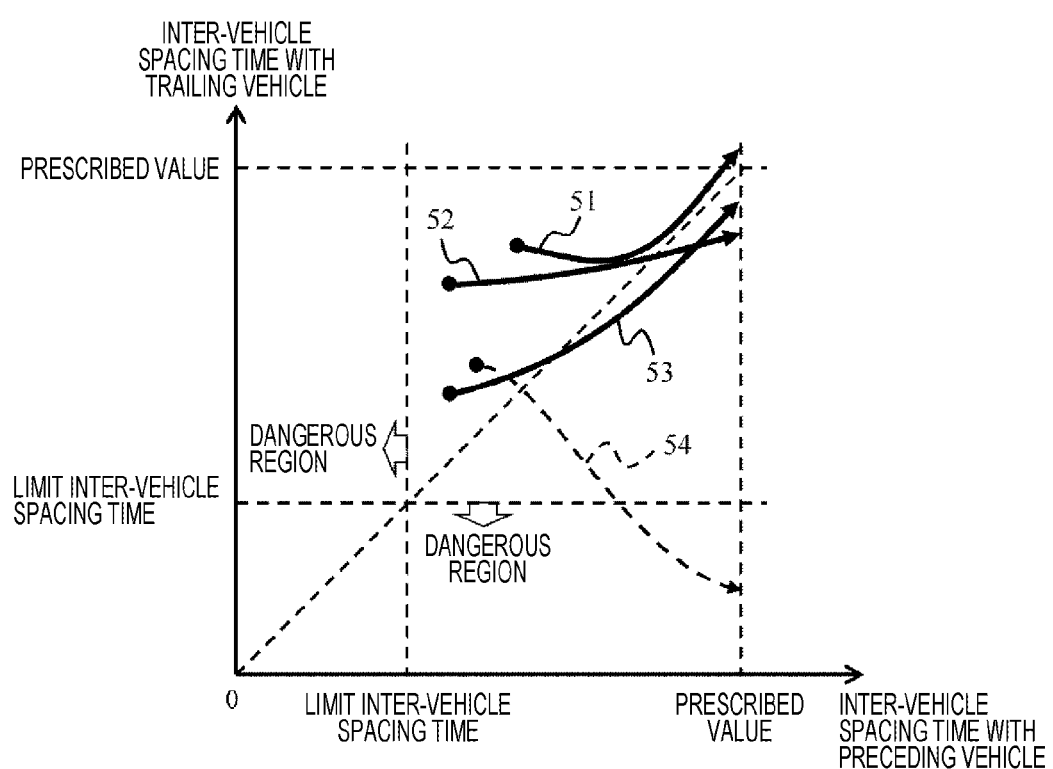
FIG. 8 is an explanatory diagram showing a relationship between the inter-vehicle spacing time with a preceding vehicle and the inter-vehicle spacing time with a trailing vehicle.

FIG. 8 is a graph showing the relationship between the inter-vehicle spacing time with the preceding vehicle and the inter-vehicle spacing time with the trailing vehicle according to the present embodiment. The limit inter-vehicle spacing time is defined for each axis. When it is less than the limit inter-vehicle spacing time, there is a high possibility that the vehicle is too close to the preceding vehicle or the trailing vehicle.

A dotted line 54 shows the case of a comparative example in which the vehicle control device 10 is not mounted. In the comparative example, only the preceding vehicle C0 is controlled. In the comparative example, as shown by the dotted line 54 in the figure, immediately after the lane change, the inter-vehicle spacing distance with the preceding vehicle C0 is to be increased to a prescribed value. Therefore, the inter-vehicle spacing time with the trailing vehicle may fall below the limit inter-vehicle spacing time.

On the other hand, in the case of the vehicle C1 equipped with the vehicle control device 10 according to the present embodiment, as shown by solid lines 51 to 53, the inter-vehicle spacing distance with the preceding vehicle and the inter-vehicle spacing distance with the trailing vehicle are appropriately controlled regardless of the positional relationship when the inter-vehicle spacing control is started at the time of lane change. Therefore, they do not fall below the respective inter-vehicle spacing times.

According to the present embodiment configured as described above, the target inter-vehicle spacing time with the preceding vehicle can be dynamically changed based on the inter-vehicle spacing time with the trailing vehicle at the time of lane change. Therefore, smooth and safe traveling in consideration of both the preceding vehicle and the trailing vehicle can be realized.

Further, according to the present embodiment, the possibility of causing the trailing device to make inadvertent sudden deceleration is reduced, so that adverse effects (such as occurrence of traffic congestion) on the traffic flow behind the trailing vehicle can be reduced.

Second Embodiment

A second embodiment will be described with reference to FIGS. 9 to 11. In each of the following embodiments including the present embodiment, differences from the first embodiment will be mainly described.

Figure 9:
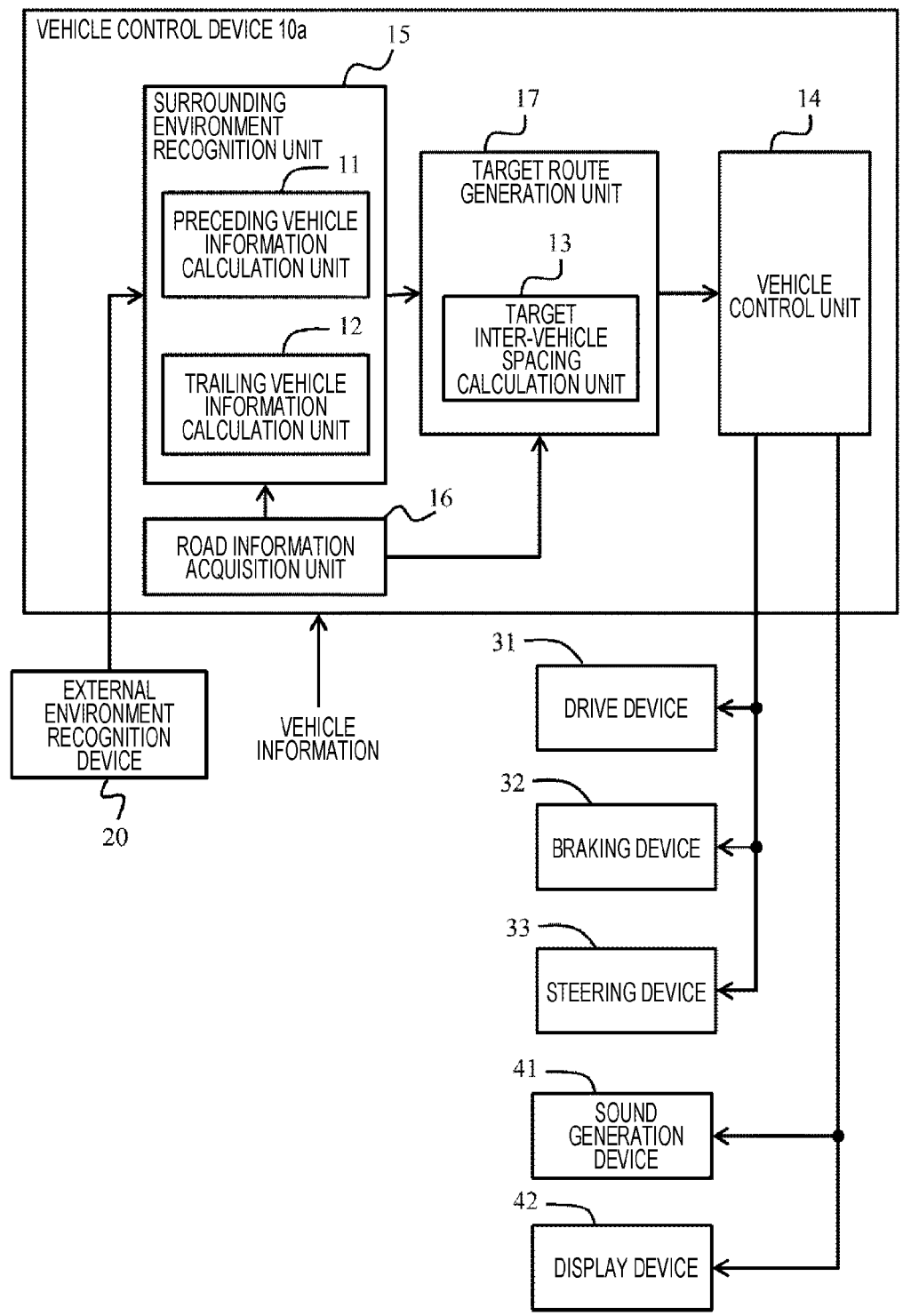
FIG. 9 is a block diagram showing a configuration of a vehicle control device according to a second embodiment.

FIG. 9 is a schematic configuration diagram of a vehicle control device 10a according to the second embodiment. FIG. 9 shows the vehicle control device 10a and its peripheral devices 31 to 33, 41, and 42.

The vehicle control device 10a is a computer that controls the vehicle, and by executing a program stored in a storage medium not shown, functions such as a preceding vehicle information calculation unit 11, a trailing vehicle information calculation unit 12, a target inter-vehicle spacing calculation unit 13, a vehicle control unit 14, a surrounding environment recognition unit 15, a road information acquisition unit 16, and a target route generation unit 17 are realized.

The vehicle control device 10a is connected to a steering device 33 in addition to the configuration of FIG. 1.

The road information acquisition unit 16 acquires map data around the current vehicle position. The acquired map data is data including shape data that is close to the actual road shape expressed by polygons, polylines, and the like, traffic restriction information (speed limit, type of vehicles that can be passed, and the like), lane classification (main line, overtaking lane, uphill lane, straight lane, left turn lane, right turn lane, and the like), presence/absence of traffic lights, signs, and the like (position information if present). The map data may be acquired from a storage medium in the vehicle or may be acquired from an external map data distribution server.

The surrounding environment recognition unit 15 includes the preceding vehicle information calculation unit 11 and the trailing vehicle information calculation unit 1*b*. The surrounding environment recognition unit 15 detects, when the vehicle travels on a general road, the lane position where the vehicle can travel, the space where the vehicle can turn, and the like, for example, on the basis of the information on the shape and position of the object detected by the external environment recognition device 20 and the determination result of whether or not the road surface is one on which the vehicle can travel.

In addition, the surrounding environment recognition unit 15 has a function of predicting the behavior, from the present to the future, of the moving body around the vehicle detected by the external environment recognition device 20. For example, the surrounding environment recognition unit 15 determines whether or not a vehicle parked while protruding from the shoulder of the road is a parked vehicle on the street or a vehicle that is waiting for a left turn, whether or not a vehicle that is on the basin (zebra zone) is a vehicle that is waiting for a right turn, or the like, by using the map data acquired by the road information acquisition unit 16 and the state of the vehicle (for example, the lighting state of the direction indicator and the like) detected by the external environment recognition device 20.

The preceding vehicle information calculation unit 11 has the same basic functions as those of the preceding vehicle information calculation unit 11 in FIG. 1. However, in the present embodiment, it is possible to perform determination through matching with the map data by the road information acquisition unit 16 as new information. Therefore, if the preceding vehicle information calculation unit 11 of the present embodiment can acquire information on the traveling lane of the vehicle and the traveling lane of the preceding vehicle, for example, the preceding vehicle information calculation unit 11 can determine the preceding vehicle using the information on the traveling lanes.

Similar to the preceding vehicle information calculation unit 11, the trailing vehicle information calculation unit 12 can also use the road information acquisition unit 16. Since the trailing vehicle information calculation unit 12 of the present embodiment can make a determination through matching with the map data, for example, if information on the traveling lane of the vehicle and the traveling lane of the trailing vehicle can be acquired, the trailing vehicle can be determined by using the information on the traveling lanes.

The target route generation unit 17 has the target inter-vehicle spacing calculation unit 13, and calculates a track and speed for moving the vehicle from the current vehicle position to the target position. The target route generation unit 17 generates a traveling track from the course information based on the lane information of the map data acquired by the road information acquisition unit 16. Furthermore, the target route generation unit 17 calculates the target speed for traveling the generated traveling track with use of the information such as the speed limit, the curvature of the route, the traffic light, the temporary stop position, the speed/position of the preceding vehicle/trailing vehicle, and the like in the map data.

The vehicle control unit 14 controls the vehicle along the target route generated by the target route generation unit 17. The vehicle control unit 14 calculates the target steering angle and the target speed on the basis of the target route. Note that when a contact between the vehicle and the obstacle is predicted, the vehicle control unit 14 calculates the target steering angle and the target speed so that the vehicle does not be in contact with the obstacle.

Then, the vehicle control unit 14 outputs target steering torque for realizing the target steering angle to the steering device 33. Further, the vehicle control unit 14 outputs target engine torque and target brake pressure for realizing the target speed to the drive device 31 and the braking device 32.

Further, the vehicle control unit 14 outputs information of the target speed, the situation when the target inter-vehicle spacing is changed by the target inter-vehicle spacing calculation unit 13, the preceding vehicle selected by the preceding vehicle information calculation unit 11, and the trailing vehicle selected by the trailing vehicle information calculation unit 12, and the like, to the sound generation device 41 and the display device 42.

Figure 10:
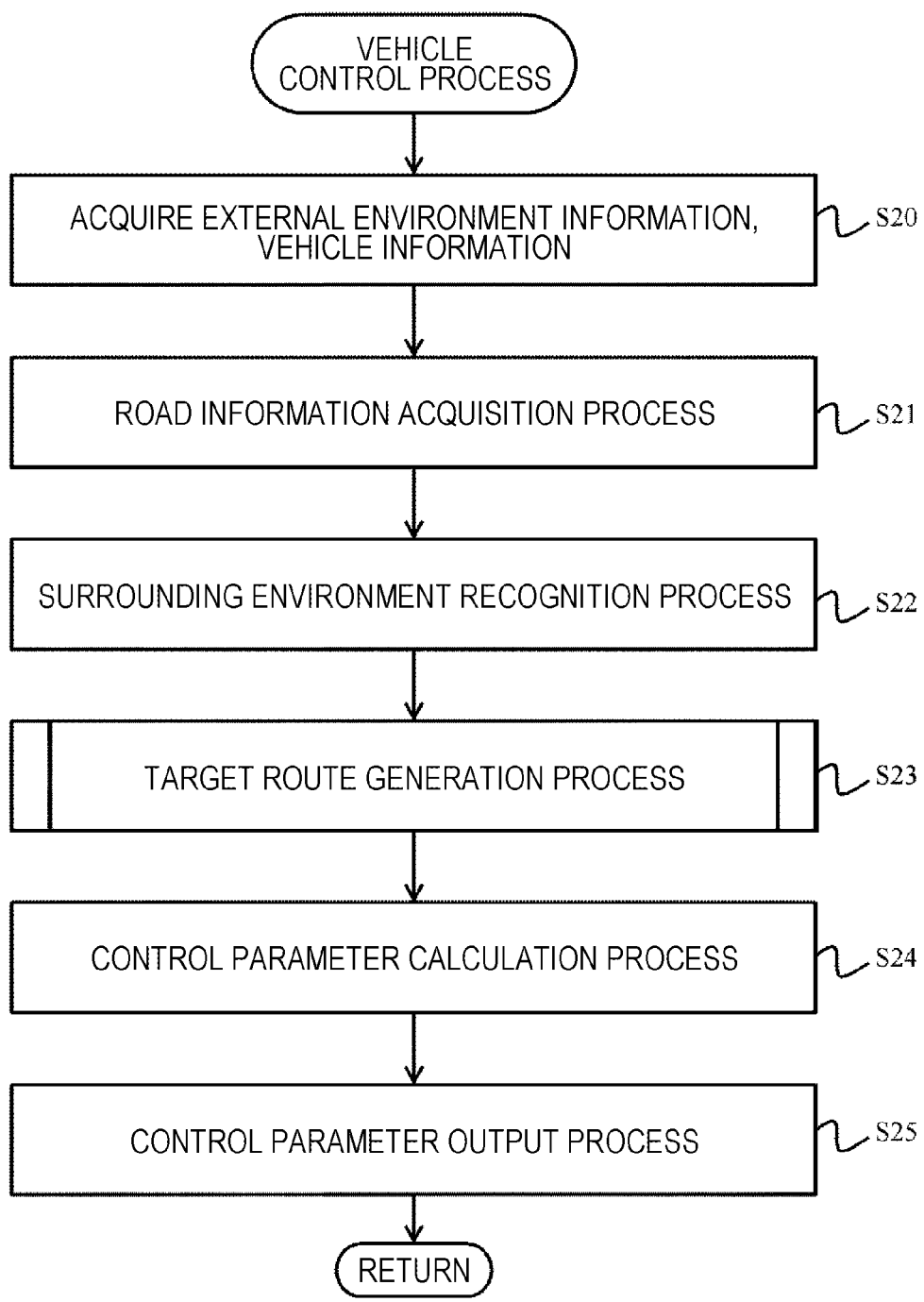
FIG. 10 is a flowchart showing a vehicle control process.

FIG. 10 is a flowchart illustrating an example of a processing procedure of the vehicle control device 10*a*. The surrounding environment recognition unit 15 of the vehicle control device 10*a* acquires external environment information and vehicle information (S20), and further acquires road information (S21).

The surrounding environment recognition unit 15 performs processing to recognize the traveling environment around the vehicle, using the external environment information and the vehicle information acquired in step S20, and the road information acquired in step S21 (S22). Specifically, the surrounding environment recognition unit arranges external environment information such as an obstacle on the map data, and detects the lane position where the vehicle can travel, the space where the vehicle can turn, and the like. In step S22, the processes of steps S11 and S12 in FIG. 2 are also executed.

The target route generation unit 17 of the vehicle control device 10*a* generates a target route based on the course (S23). In this process, the target inter-vehicle spacing calculation process described in step S13 in FIG. 2 is also executed.

The vehicle control unit 14 calculates control parameters for causing the vehicle to travel according to the target route generated in step S23 (S24), outputs the calculated control parameters to the steering device 33, the drive device 31, and the braking device 32, respectively (S25), and ends the series of processing. Similar to the above description, step S24 is an example of a "control parameter calculation unit". Step S25 is an example of a "control parameter output unit".

The control parameters output to the steering device 33 includes target steering torque for realizing the target steering angle. However, depending on the configuration of the steering device 33, the target steering angle can be directly output.

Figure 11:
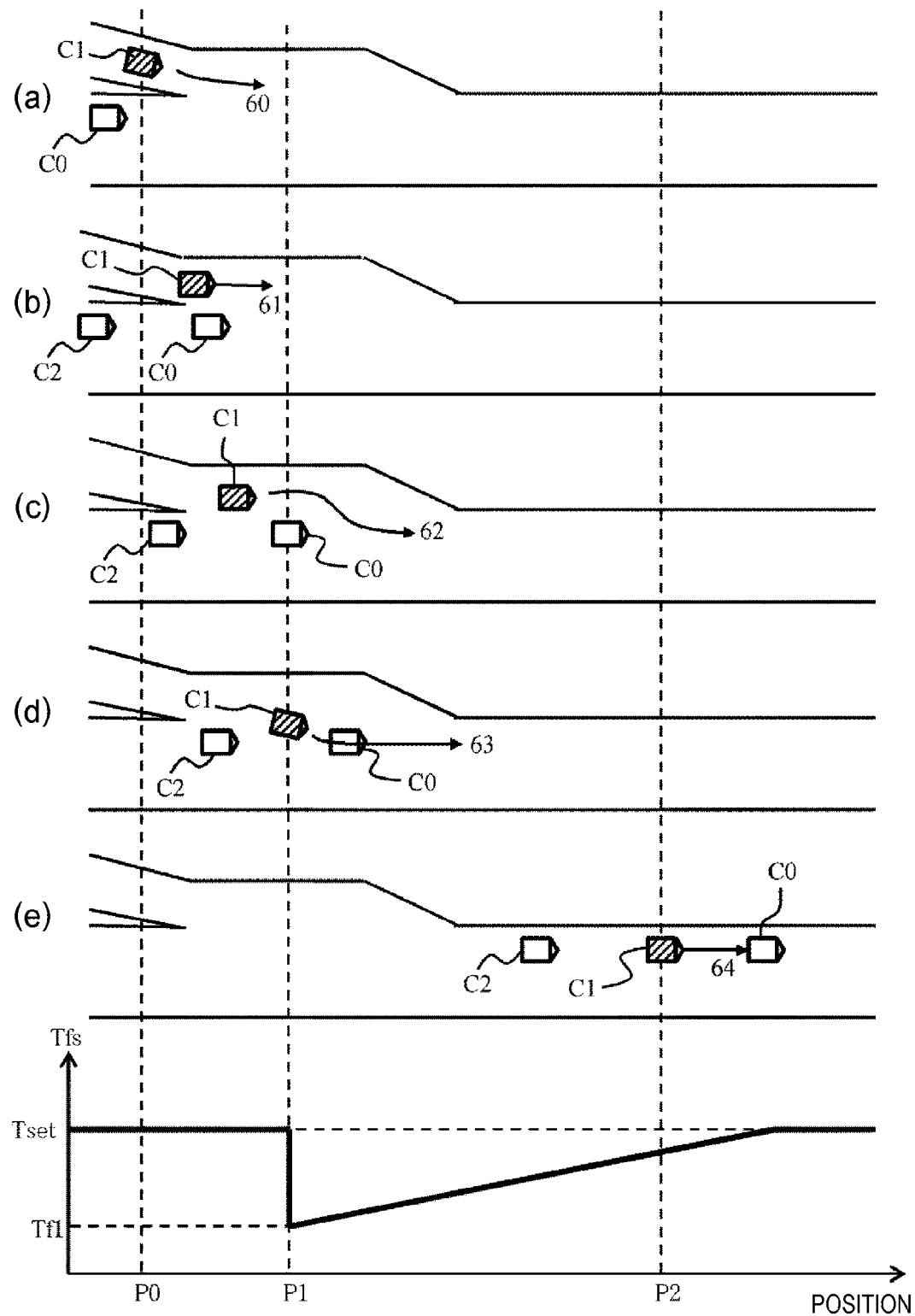
FIG. 11 is an explanatory diagram showing a state of changing the target inter-vehicle spacing time.

FIG. 11 is an explanatory diagram showing a state in which the vehicle C1 joins the main line having two lanes.

FIG. 11 shows the case where the vehicle C1 joins while traveling in parallel between the vehicle C0 and the vehicle C2 that are traveling on the main line.

At a point P0 in FIG. 11(*a*), the vehicle C1 is traveling on the merging lane, and a target track 60 of the vehicle C1 at that time is generated along the merging lane. The target speed of the vehicle C1 is calculated so as to follow the speed limit of the merging lane. At this time, the target inter-vehicle spacing time of the vehicle C1 is set to a prescribed value set in advance.

As shown in FIG. 11(*b*), when the vehicle C1 reaches the connection point between the merging lane and the main line, the merging lane is interrupted thereafter, and thus the lane change to the main line is required. However, in FIG. 11(b), since the vehicle C0 is traveling on the main line, if the vehicle C1 changes the lane to the main line, there is a possibility of contact with the vehicle C0. Therefore, at the time of FIG. 11(b), a target track 61 is calculated along the merging lane. However, in this state, since the lane change to the main line is impossible, the vehicle control device 10a calculates the target speed for moving to the space between the vehicle C0 and the vehicle C2 on the main line, and starts moving.

As shown in FIG. 11(c), when the vehicle C1 is positioned between the vehicle C0 and the vehicle C1 on the main line and travels in parallel, the vehicle control device 10a determines that the lane change is possible, and calculates a target track 62 for lane change to the main line. At this time, the target speed is calculated such that the position is maintained between the vehicle C0 and the vehicle C2 on the main line.

As shown in FIG. 11(d), when the vehicle C1 starts lane change to the main line and reaches a point P1, the vehicle control device 10a determines the vehicle C0 to be a preceding vehicle and determines the vehicle C2 to be a trailing vehicle.

When the inter-vehicle spacing time Tr with the trailing vehicle C2 is a prescribed value (for example, 1 second) or less and the inter-vehicle spacing time Tf with the preceding vehicle C0 is less than the prescribed value, the vehicle control device 10a sets the inter-vehicle spacing time Tf with the preceding vehicle C0 as the target inter-vehicle spacing Tf1. Subsequently, the vehicle control device 10a performs a process of restoring the target inter-vehicle spacing time to the prescribed value using the change rate θ based on the inter-vehicle spacing time Tr with the trailing vehicle C2 described in FIG. 5.

In FIG. 11(e), the vehicle C1 reaches a point P2. The vehicle C1 is in the process of gradually restoring the target inter-vehicle spacing time to a prescribed value Tset using the change rate θ shown in FIG. 5. Thereafter, the target inter-vehicle spacing time is restored to the prescribed value Tset.

The present embodiment configured in this way also achieves the same effects as those of the first embodiment. Further, even when it is applied to automatic driving control that controls both steering and speed, the target inter-vehicle spacing time with the preceding vehicle can be dynamically changed on the basis of the inter-vehicle spacing time with the trailing vehicle. Therefore, smooth and safe traveling in consideration of both the preceding vehicle and the trailing vehicle can be realized. Furthermore, even in the present embodiment, since the trailing vehicle is not caused to make inadvertent sudden deceleration, adverse effects (such as occurrence of traffic congestion) on the traffic flow behind the trailing vehicle can be reduced.

Third Embodiment

A third embodiment will be described with reference to FIGS. 12 to 14. In the present embodiment, description will be given on the case where the target inter-vehicle spacing time is controlled in consideration of only the preceding vehicle at the time of lane change.

Figure 12:
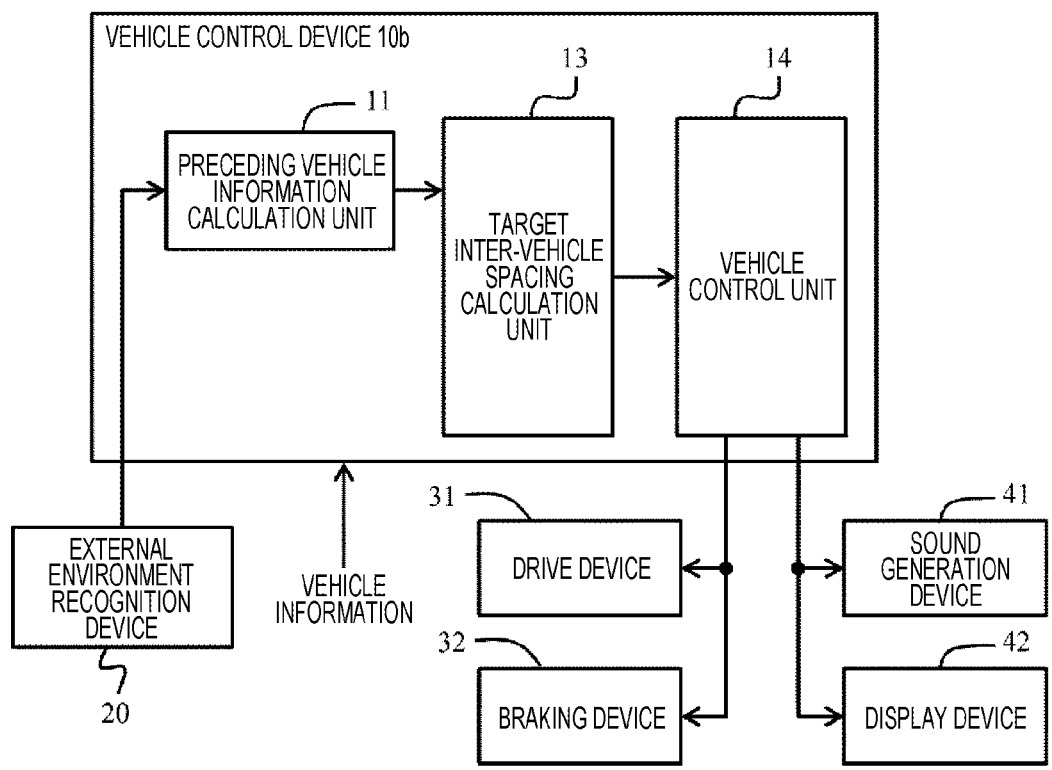
FIG. 12 is a block diagram illustrating a configuration of a vehicle control device according to a third embodiment.

FIG. 12 is a schematic configuration diagram of a vehicle control device 10b according to the present embodiment. The vehicle control device 10b of the present embodiment does not include the trailing vehicle information calculation unit 12, as compared with the vehicle control device 10 of the first embodiment.

Figure 13:
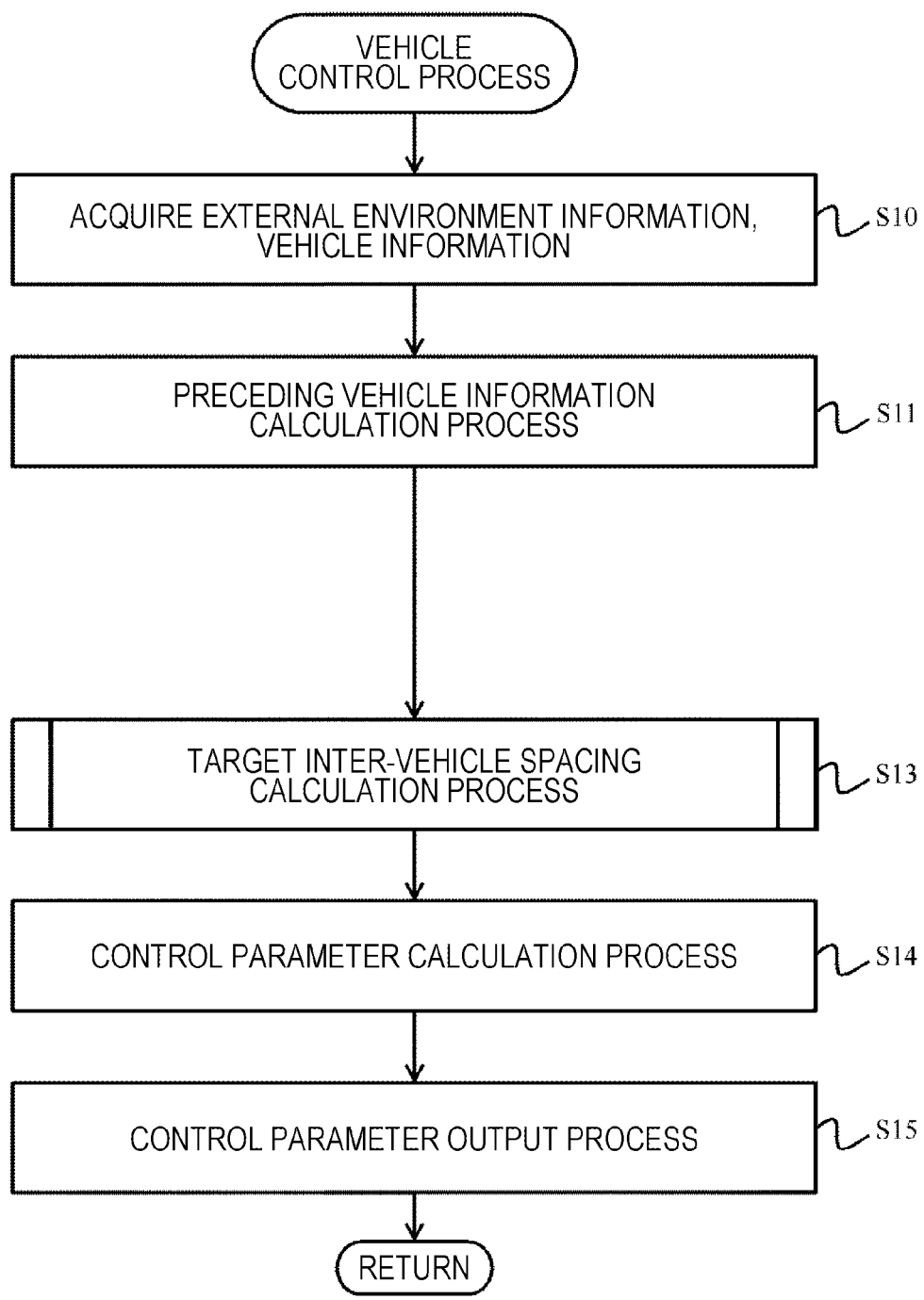
FIG. 13 is a flowchart showing a vehicle control process.

FIG. 13 is a flowchart of the vehicle control process according to the present embodiment. Compared with the vehicle control process described in FIG. 2, the vehicle control process of the present embodiment does not include step S12 for calculating the trailing vehicle information.

Figure 14:
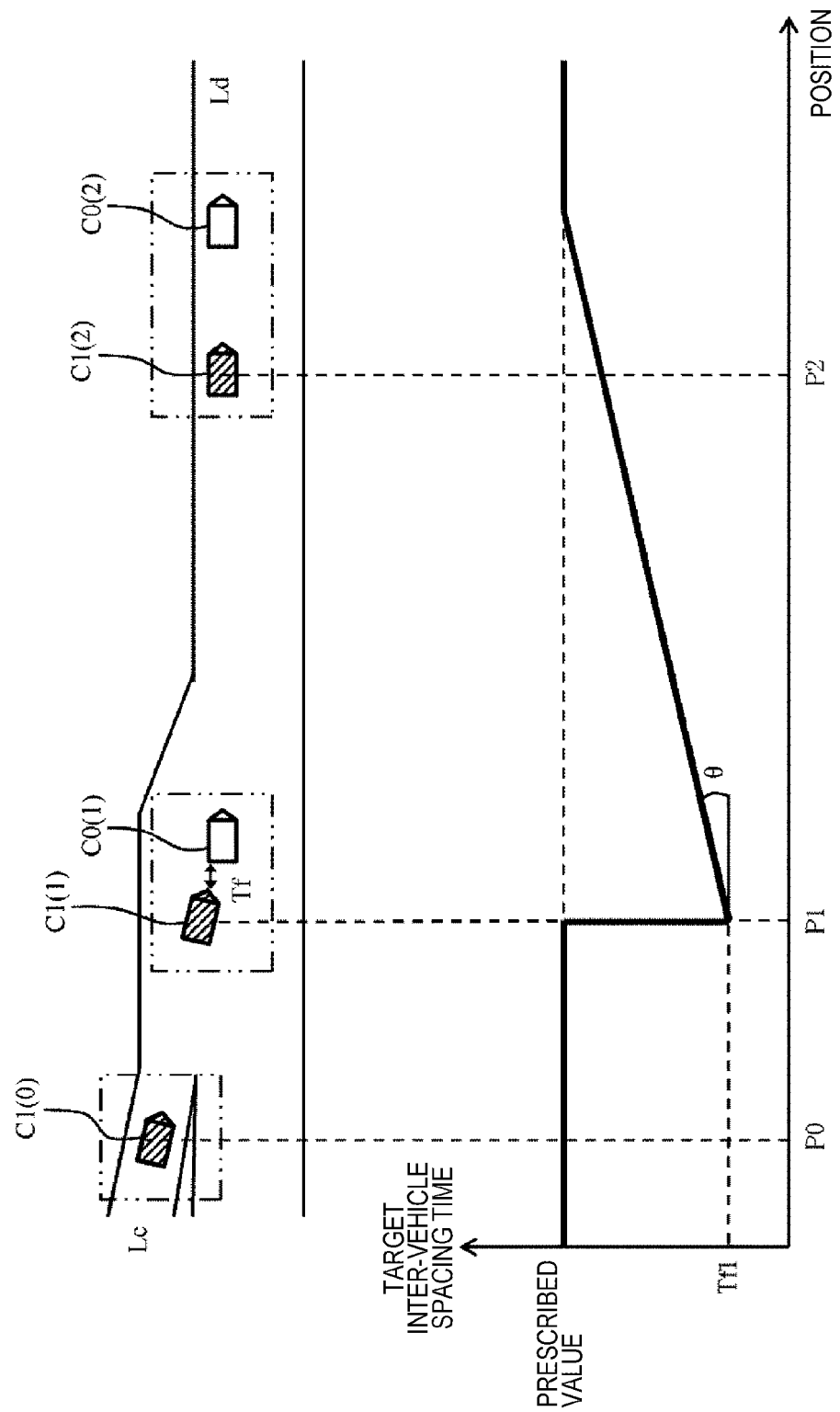
FIG. 14 is an explanatory diagram showing a state of changing the target inter-vehicle spacing time.

FIG. 14 is a state explanatory diagram showing a state where the vehicle C1 joins the main line having two lanes. FIG. 14 shows the case where the vehicle C1 joins behind the vehicle C0 traveling on the main line.

At a point P0 in FIG. 14, the vehicle C1(0) is controlled according to a prescribed value of the target inter-vehicle spacing set in advance.

When the vehicle C1 travels on the merging lane and reaches a point P1 while traveling in parallel with the vehicle C0 traveling on the main line, the vehicle C1(1) starts merging and determines the vehicle C0(1) to be a preceding vehicle. When the inter-vehicle spacing time Tf with the preceding vehicle C0(1) is less than the prescribed value, the vehicle control device 10b sets the inter-vehicle spacing time Tf with the preceding vehicle C0(1) as the target inter-vehicle spacing Tf1.

Subsequently, the vehicle control device 10b performs a process of restoring the target inter-vehicle spacing that is temporarily reduced to the prescribed value, at a predetermined change rate θ. At a point P2, the target inter-vehicle spacing is being restored to the prescribed value at the predetermined change rate θ. Thereafter, the target inter-vehicle spacing time is restored to the prescribed value.

In the present embodiment configured as described above, even when the vehicle C1 travels consciously so that the inter-vehicle spacing time with the preceding vehicle C0 is a prescribed value or less due to a lane change or the like, it is possible to reduce the discomfort of the occupant by temporarily setting the target inter-vehicle spacing time to a value lower than the prescribed value and gradually restoring it from the lower value to the prescribed value.

The above description is merely an example, and when interpreting the invention, there is no limitation or restriction on the correspondence between the items described in the above embodiments and the items described in the claims. For example, while the inter-vehicle spacing time has been described as an inter-vehicle spacing control parameter, the inter-vehicle spacing distance may be used instead of the inter-vehicle spacing time. Alternatively, another parameter calculated using the inter-vehicle spacing time or the inter-vehicle spacing distance may be used.

Moreover, in each of the embodiments, description has been given mainly on the case where the vehicle joins the main line from the merging lane. However, the present invention is not limited to this. The present invention is also applicable to the case of changing the lane on a multi-lane road, for example.

Furthermore, while a passenger car is described as an example of the vehicle in each of the embodiments, the present invention is also applicable to a self-propelled construction machine, a self-propelled robot, a so-called clone (any of the ground traveling type, air moving type, and underwater or water moving type), and the like, for example.

Note that the third embodiment can also be expressed as follows, for example. "A vehicle control device that detects inter-vehicle spacing information with a preceding vehicle and controls the speed of the vehicle so as to maintain a prescribed value of inter-vehicle spacing information set in advance, in which when the inter-vehicle spacing information with the preceding vehicle is lower than a prescribed value of the inter-vehicle spacing information, the vehicle control device sets the inter-vehicle spacing information with the preceding vehicle as target inter-vehicle spacing, and restores the target inter-vehicle spacing to the prescribed value of the inter-vehicle spacing information at a predetermined rate."

Further, the configurations described in the claims can be combined in any way other than the combinations specified in the claims.

REFERENCE SIGNS LIST 10, 10a, 10b vehicle control device
11 preceding vehicle information calculation unit
12 trailing vehicle information calculation unit
13 target inter-vehicle spacing calculation unit
14 vehicle control unit
15 surrounding environment recognition unit
16 road information acquisition unit
17 target route generation unit
20 external environment recognition device
31 drive device
32 braking device
33 steering device
41 sound generation device
42 display device
C0 preceding vehicle
C1 vehicle
C2 trailing vehicle

The invention claimed is:

1. A vehicle control device that controls a first vehicle that is an own vehicle so as to maintain inter-vehicle spacing with a preceding vehicle, the vehicle control device comprising:
a target inter-vehicle spacing calculation unit that calculates target inter-vehicle spacing information based on inter-vehicle spacing information with the preceding vehicle and inter-vehicle spacing information with a trailing vehicle, wherein the preceding vehicle is traveling ahead of the first vehicle and the trailing vehicle is traveling behind the first vehicle with respect to a lane,
wherein the target inter-vehicle spacing calculation unit calculates the target inter-vehicle spacing information based on the inter-vehicle spacing information with the trailing vehicle so that the target inter-vehicle spacing information is restored to a previous value at a predetermined change rate, the previous value being the value before a lane change; and
a vehicle control unit that controls speed of the first vehicle so as to maintain the target inter-vehicle spacing information calculated.

2. The vehicle control device according to claim 1, wherein the inter-vehicle spacing information is an inter-vehicle spacing time or an inter-vehicle spacing distance.

3. The vehicle control device according to claim 2, wherein when a switching timing is received, the target inter-vehicle spacing calculation unit sets the inter-vehicle spacing information with the preceding vehicle as the target inter-vehicle spacing information.

4. The vehicle control device according to claim 3, wherein when the inter-vehicle spacing information with the preceding vehicle is within a predetermined range set in advance, the target inter-vehicle spacing calculation unit sets the inter-vehicle spacing information with the preceding vehicle as the target inter-vehicle spacing information, and when the inter-vehicle spacing information with the preceding vehicle is out of the predetermined range, the target inter-vehicle spacing calculation unit sets a value within the predetermined range calculated from the inter-vehicle spacing information with the preceding vehicle as the target inter-vehicle spacing information.

5. The vehicle control device according to claim 4, wherein the target inter-vehicle spacing calculation unit sets the inter-vehicle spacing information with the preceding vehicle as the target inter-vehicle spacing information when the inter-vehicle spacing information with the trailing vehicle is equal to or less than a value set in advance and the inter-vehicle spacing information with the preceding vehicle is within the predetermined range.

6. The vehicle control device according to claim 3, wherein the switching timing is timing when, at a time that the first vehicle changes a lane, the preceding vehicle and the trailing vehicle are recognized among vehicles traveling in the lane to which the first vehicle changed.

7. The vehicle control device according to claim 2, further comprising a target route generation unit that generates a target route including speed and a traveling direction of the first vehicle based on information from an external environment recognition device that recognizes a traffic environment around the first vehicle,
wherein the target inter-vehicle spacing calculation unit is used by the target route generation unit.

8. The vehicle control device according to claim 2, further comprising:
a preceding vehicle information calculation unit that determines the preceding vehicle and calculates the inter-vehicle spacing information with the preceding vehicle;
a trailing vehicle information calculation unit that determines the trailing vehicle and calculates the inter-vehicle spacing information with the trailing vehicle;
a control parameter calculation unit that calculates a control parameter for controlling the speed of the first vehicle; and
a control parameter output unit that outputs the calculated control parameter to a control target device.

9. The vehicle control device according to claim 1, wherein the target inter-vehicle spacing calculation unit increases the predetermined change rate as the inter-vehicle spacing information with the trailing vehicle increases.

* * * * *